United States Patent
Liu et al.

(10) Patent No.: US 10,042,190 B2
(45) Date of Patent: Aug. 7, 2018

(54) SECOND ORDER DETECTION OF TWO ORTHOGONAL DITHERS FOR I/Q MODULATOR BIAS CONTROL

(71) Applicant: Futurewei Technologies, Inc., Plano, TX (US)

(72) Inventors: Tiangong Liu, San Jose, CA (US); Hongbing Lei, San Jose, CA (US); Xiao Shen, San Bruno (CA)

(73) Assignee: Futurewei Technologies, Inc., Plano, TX (US)

( * ) Notice: Subject to any disclaimer, the term of this patent is extended or adjusted under 35 U.S.C. 154(b) by 100 days.

(21) Appl. No.: 15/179,704

(22) Filed: Jun. 10, 2016

(65) Prior Publication Data

US 2017/0357110 A1    Dec. 14, 2017

(51) Int. Cl.

| | |
|---|---|
| *H04B 10/50* | (2013.01) |
| *G02F 1/01* | (2006.01) |
| *G02F 1/225* | (2006.01) |
| *H04B 10/516* | (2013.01) |
| *H04B 10/58* | (2013.01) |
| *H04B 10/69* | (2013.01) |
| *H04J 14/08* | (2006.01) |
| *G02F 1/21* | (2006.01) |

(52) U.S. Cl.
CPC ............ *G02F 1/0123* (2013.01); *G02F 1/225* (2013.01); *H04B 10/5161* (2013.01); *H04B 10/58* (2013.01); *H04B 10/697* (2013.01); *H04J 14/086* (2013.01); *G02F 2001/212* (2013.01)

(58) Field of Classification Search
CPC .. G02F 1/0123; G02F 1/225; G02F 2001/212; H04B 10/5161; H04B 10/58; H04B 10/697; H04J 14/086

USPC .................................................. 398/182–201
See application file for complete search history.

(56) References Cited

U.S. PATENT DOCUMENTS

| | | | |
|---|---|---|---|
| 7,106,486 B1 * | 9/2006 | Nahapetian ........... | G02F 1/0123 |
| | | | 359/238 |
| 7,266,306 B1 * | 9/2007 | Harley ................. | H04B 10/505 |
| | | | 398/182 |
| 9,124,364 B1 * | 9/2015 | Sotoodeh ......... | H04B 10/50577 |

(Continued)

OTHER PUBLICATIONS

Kawakami et al, Auto bias control and bias hold circuit for IQ modulator in flexible optical QAM transmitter with Nyquist filtering, Nov. 2014, Optics Express, Pages All Document.*

(Continued)

*Primary Examiner* — Ken N Vanderpuye
*Assistant Examiner* — Dibson Sanchez
(74) *Attorney, Agent, or Firm* — Conley Rose, P.C.

(57) ABSTRACT

A Dual Parallel (DP)-Inphase/Quadrature (I/Q) Mach-Zehnder Modulator (MZM) bias controller configured to generate a pair of orthogonal dither signals; multiply the pair of dither signals to create a second order orthogonal dither signal; and lock an Inphase (I) I MZM of a DP-I/Q MZM to a value of a corresponding I component of a transmission signal by applying the pair of orthogonal dither signal to a Quadrature (Q) MZM and a Phase (P) MZM of the DP-I/Q MZM; applying an I bias signal to the I MZM of the DP-I/Q MZM; detecting an output of the DP-I/Q MZM; and determining an I error signal in the output of the I MZM of the DP-I/Q MZM based on the product of second order dither signal and the output of the DP-I/Q MZM.

20 Claims, 4 Drawing Sheets

(56) References Cited

U.S. PATENT DOCUMENTS

| | | | |
|---|---|---|---|
| 9,407,361 B1* | 8/2016 | Zhang | H04B 10/07955 |
| 9,735,878 B2* | 8/2017 | Enoki | H04B 10/50575 |
| 9,823,540 B2* | 11/2017 | Gottwald | H04B 10/50577 |
| 2002/0001116 A1* | 1/2002 | Kajiya | G02F 1/0123 398/197 |
| 2005/0068600 A1* | 3/2005 | Ogura | G02F 1/0123 359/238 |
| 2005/0117191 A1* | 6/2005 | Griffin | G02F 1/0123 359/245 |
| 2006/0127102 A1* | 6/2006 | Roberts | H04B 10/505 398/182 |
| 2006/0139735 A1 | 6/2006 | Caplan | |
| 2007/0019968 A1* | 1/2007 | Hashimoto | G02F 1/0327 398/198 |
| 2008/0181620 A1* | 7/2008 | Sasaki | H04B 10/5053 398/198 |
| 2009/0003840 A1 | 1/2009 | Nahapetian et al. | |
| 2009/0244685 A1* | 10/2009 | Hoshida | G02F 1/0123 359/279 |
| 2010/0021182 A1* | 1/2010 | Asano | H04B 10/5057 398/188 |
| 2011/0013907 A1 | 1/2011 | Sugihara et al. | |
| 2012/0155864 A1* | 6/2012 | Pepeljugoski | H04B 10/0799 398/37 |
| 2012/0155880 A1* | 6/2012 | Nishimoto | H04B 10/50572 398/79 |
| 2012/0288284 A1* | 11/2012 | Yoshida | H04B 10/5053 398/186 |
| 2012/0294627 A1* | 11/2012 | Qi | G02F 1/0123 398/183 |
| 2013/0202315 A1* | 8/2013 | Akiyama | H04B 10/50 398/182 |
| 2014/0023368 A1* | 1/2014 | Bhandare | H04J 14/06 398/65 |
| 2014/0029956 A1* | 1/2014 | Le Taillandier De Gabory | G02F 1/0123 398/186 |
| 2014/0168741 A1 | 6/2014 | Li et al. | |
| 2014/0233963 A1* | 8/2014 | Le Taillandier De Gabory | H04B 10/541 398/183 |
| 2015/0236790 A1 | 8/2015 | Guo et al. | |
| 2016/0173304 A1* | 6/2016 | Le Taillandier De Gabory | H04B 10/50575 398/76 |
| 2016/0282699 A1* | 9/2016 | Gottwald | H04B 10/50577 |
| 2017/0117961 A1* | 4/2017 | Yoneyama | H04B 10/07955 |

OTHER PUBLICATIONS

Foreign Communication From a Counterpart Application, PCT Application No. PCT/CN2017/087451, English Translation of International Search Report dated Aug. 23, 2017, 7 pages.

Foreign Communication From a Counterpart Application, PCT Application No. PCT/CN2017/087451, English Translation of Written Opinion dated Aug. 23, 2017, 4 pages.

Sotoodeh, et al., "Modulator Bias and Optical Power Control of Optical Complex E-Field Modulators," Journal of Lightwave Technology, vol. 29, No. 15, Aug. 1, 2011, pp. 2235-2248.

* cited by examiner

SECOND ORDER DETECTION OF TWO ORTHOGONAL DITHERS FOR I/Q MODULATOR BIAS CONTROL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The employment of higher-order modulation in terabit optical fiber transmission systems may be a way of increasing spectral efficiency and making better use of transmission capacity of currently existing fiber infrastructure. However, transmission signal quality and transmission channel impairments may become more critical for performance of higher-order modulation systems. Advances in high speed analog-to-digital converters (ADCs) and deep submicron semiconductor processing technologies in digital signal processors (DSPs) may enable advanced digital signal processing techniques to be applied for signal conditioning and/or distortion compensation at optical transmitters and/or receivers.

SUMMARY

Current schemes are unable to accurately bias an DP-I/Q MZM in all scenarios. As will be discussed in detail below, a scheme for accurately biasing an DP-I/Q MZM in all scenarios is provided.

In one embodiment, the disclosure includes a Dual Polarization (DP)-Inphase/Quadrature (I/Q) Mach-Zehnder Modulator (MZM) bias controller configured to generate a pair of orthogonal dither signals, multiply the pair of orthogonal dither signals to create a second order dither signal, and lock an Inphase (I) I MZM of a DP-I/Q MZM to a value of a corresponding I component of a transmission signal by applying the pair of orthogonal dither signals to a Quadrature (Q) MZM and a Phase (P) MZM of the DP-I/Q MZM, applying an I bias signal to the I MZM of the DP-I/Q MZM, detecting an output of the DP-I/Q MZM, and determining an I error signal in the output of the I MZM of the DP-I/Q MZM based on the product of the second order dither signal and the output of the DP-I/Q MZM.

In an embodiment, the bias controller is further configured to lock the Q MZM of the DP-I/Q MZM to a value of a corresponding Q component of the transmission signal by applying the pair of orthogonal dither signals to the I MZM and the P MZM of the DP-I/Q MZM, applying a Q bias signal to the Q MZM of the DP-I/Q MZM, detecting an output of the DP-I/Q MZM, and determining a Q error signal in the output of the Q MZM of the DP-I/Q MZM based on the product of the second order dither signal and the output of the DP-I/Q MZM. In an embodiment, the bias controller is further configured to lock a phase of the DP-I/Q MZM to a value of a corresponding combined I/Q value of the transmission signal by applying the pair of orthogonal dither signals to the Q MZM and the I MZM of the DP-I/Q MZM, applying a P bias signal to the P MZM of the DP-I/Q MZM, detecting an output of the DP-I/Q MZM, and determining a P error signal in the output of the DP-I/Q MZM based on the product of the second order dither signal and the output of the DP-/Q MZM. In an embodiment, the bias controller is further configured to iteratively adjust the I bias signal based on the I error signal to support locking the I MZM to the I component of the transmission signal, iteratively adjust the Q bias signal based on the Q error signal to support locking the Q MZM to the Q component of the transmission signal, and iteratively adjust the P bias signal based on the P error signal to support locking the P MZM to the combined I/Q value of the transmission signal. In an embodiment, the pair of orthogonal dither signals is applied to the I MZM and the Q MZM but not the P MZM when locking the P MZM. In an embodiment, the pair of orthogonal dither signals is applied to the I MZM and the P MZM but not the Q MZM when locking the Q MZM. In an embodiment, the pair of orthogonal dither signals is applied to the Q MZM and the P MZM but not the I MZM when locking the I MZM. In an embodiment, the I MZM, the Q MZM, and the P MZM are locked starting from arbitrary values and without pre-calibrating the DP-I/Q MZM. In an embodiment, the I MZM, the Q MZM, and the P MZM are locked when peak to peak driving voltage of the transmission data (Vpp) is equal to a half-wave voltage (Vπ) of the DP-I/Q MZM.

In another embodiment, the disclosure includes a Dual Polarization (DP)-Inphase/Quadrature (I/Q) Mach-Zehnder Modulator (MZM) bias controller comprising a Quadrature (Q) bias circuit configured to generate a Q bias signal for application to a Q MZM of a DP-I/Q MZM to lock the Q MZM to a value of a corresponding Q component of a transmission signal, a dither signal generator configured to generate a pair of orthogonal dither signals, a dither switch coupled to the Q bias circuit and the dither signal generator, the dither switch configured to multiply the pair of orthogonal dither signals to create a second order orthogonal dither signal, and combine the pair of orthogonal dither signals with an Inphase (I) bias signal and a Phase (P) bias signal, and an error signal generator coupled to the Q bias circuit and the dither signal generator, the error signal generator configured to receive the pair of orthogonal dither signals from the dither signal generator, receive an output of the DP-I/Q MZM, and determine a Q error signal as the product of the output of the Q MZM of the DP-I/Q MZM and the second order dither signal.

In an embodiment, a bias controller is configured to cause the dither switch to combine the pair of orthogonal dither signals with the Q bias signal and an Inphase (I) bias signal but not a Phase (P) bias signal when locking a P MZM of the DP-I/Q MZM to a combined I/Q value of the transmission signal. In an embodiment, the bias controller is further configured to cause the dither switch to combine the pair of orthogonal dither signals with the Q bias signal and the P bias signal but not a I bias signal when locking an I MZM of the DP-I/Q MZM to an I value of the transmission signal. In an embodiment, the bias controller is further configured to cause the dither switch to combine the pair of orthogonal dither signals with the I bias signal and the P bias signal but not a Q bias signal when locking the Q MZM of the DP-I/Q MZM to a Q value of the transmission signal. In an embodiment, the bias controller is further configured to lock the I MZM, the Q MZM, and the P MZM starting from arbitrary values and without pre-calibrating the DP-I/Q MZM. In an embodiment, the bias controller is further configured to lock the I MZM, the Q MZM, and the P MZM when a peak to peak driving voltage of the transmission data (Vpp) is equal to a half-wave voltage (Vπ) of the DP-I/Q MZM. In an embodiment, an Inphase (I) bias circuit is coupled to the dither switch, the I bias circuit is configured to generate an I bias signal for application to an I MZM of a DP-I/Q MZM to lock the I MZM to a value of a corresponding I component of a transmission signal, wherein the dither switch is further configured to combine the pair of orthogonal dither signals with the Q bias signal, and wherein the error signal generator is further configured to determine an I error signal in the output of the I MZM of the DP-I/Q MZM based on the product of the second order dither signal and the output of the DP-I/Q MZM.

In yet another embodiment, the disclosure includes a method implemented in a Dual Polarization (DP)-Inphase/ Quadrature (I/Q) Mach-Zehnder Modulator (MZM) bias controller including generating a pair of orthogonal dither signals, multiplying the pair of orthogonal dither signals to create a second order dither signal, applying an Inphase (I) bias signal to an I MZM of a DP-I/Q MZM to lock the I MZM to a value of a corresponding I component of a transmission signal, combining the pair of orthogonal dither signals with a Quadrature (Q) bias signal and a Phase (P) bias signal, detecting an output of the DP-I/Q MZM, and determining an I error signal in the output of the I MZM of the DP-I/Q MZM based on the product of the second order dither signal and the output of the DP-I/Q MZM.

For the purpose of clarity, any one of the foregoing embodiments may be combined with any one or more of the other foregoing embodiments to create a new embodiment within the scope of the present disclosure.

In an embodiment, the method includes applying a Q bias signal to a Q MZM of the DP-I/Q MZM to lock the Q MZM to a value of a corresponding Q component of the transmission signal, combining the pair of orthogonal dither signals with the I bias signal and the P bias signal, and determining a Q error signal in the output of the Q MZM of the DP-I/Q MZM based on the product of the second order dither signal and the output of the DP-I/Q MZM. In an embodiment, the method includes applying the P bias signal to lock a P MZM of the DP-I/Q MZM to a combined I/Q value of the transmission signal, and determining a P error signal in the output of the DP-I/Q MZM based on the product of the second order dither signal and the output of the DP-I/Q MZM. In an embodiment, the method includes employing a time division (TDM) multiplexing scheme to apply the second order dither signal to the P bias signal, the I bias signal, and the Q bias signal such that the second order dither signal is applied to the I bias signal and the Q bias signal when the P MZM is being locked, applied to the I bias signal and the P bias signal when the Q MZM is being locked, and applied to the P bias signal and the Q bias signal when the I MZM is being locked.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
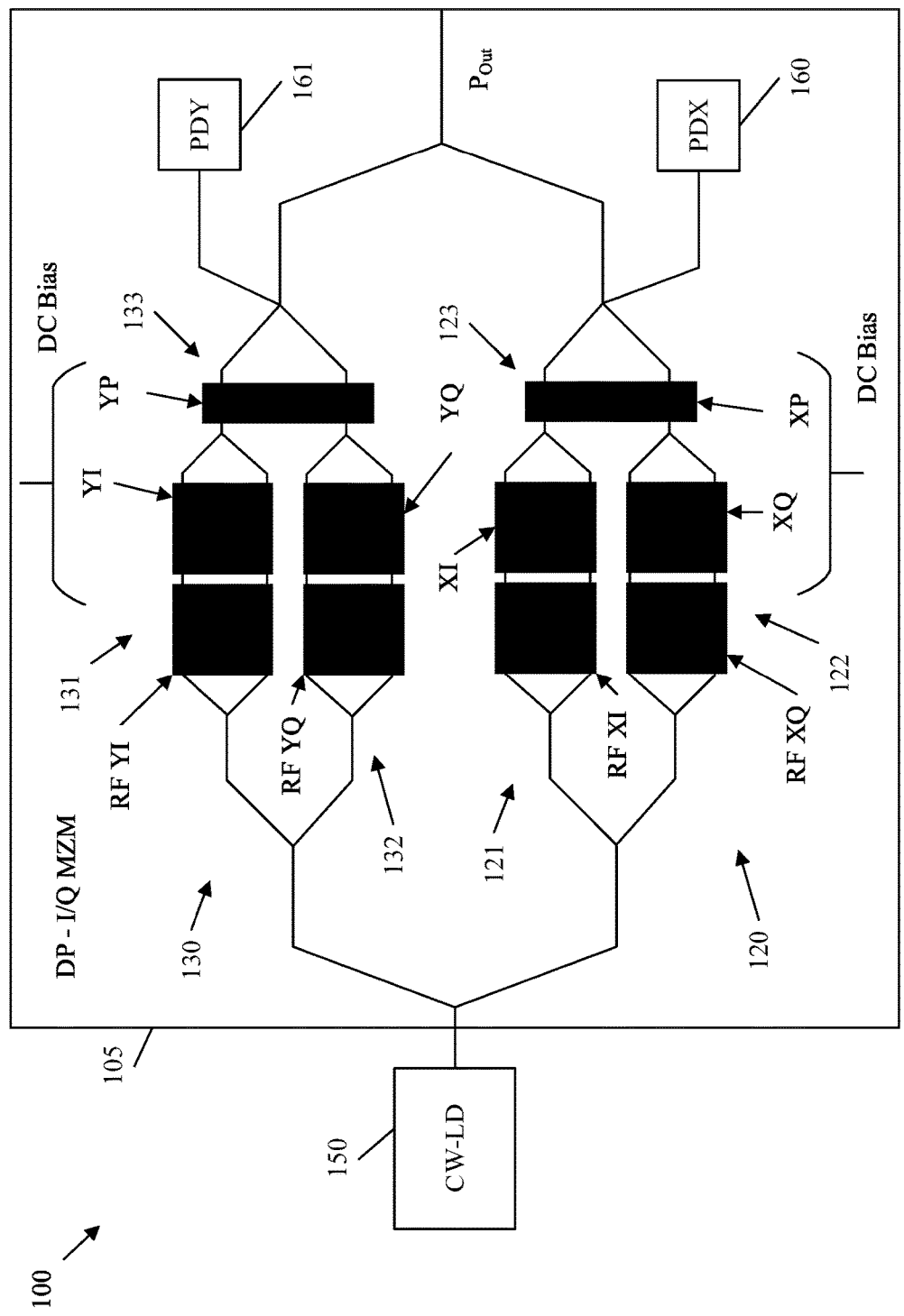
FIG. 1 is a schematic diagram of an embodiment of a Dual Polarization (DP)-Inphase/Quadrature (I/Q) Mach-Zehnder Modulator (MZM) based optical transmitter (Tx).

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Optical DP-I/Q modulators are employed to modulate electrical signal data onto an optical carrier for transmission across an optical medium. During the process of modulation, bias signals are also employed to ensure that each portion of a modulator locks to an appropriate value used by a DP I/Q modulation scheme. The bias locking accuracy significantly affects the system performance of the DP I/Q modulated optical signal. For example, an I/Q MZM may be employed in 100 Gigabytes per second (Gbps) or greater transmissions with advanced modulation schemes such as Quadrature Phase Shift Keying (QPSK) and Quadrature amplitude modulation (QAM) schemes (e.g., 16-QAM, 32-QAM, 64-QAM, 128-QAM, etc.) Accurate MZM bias control is needed to ensure proper system performance over multiple kinds of dependence and impairment such as wavelength, temperature, thermal crosstalk, aging, etc.

A DP-I/Q MZM comprises a Quadrature (Q) MZM and an Inphase (I) MZM for modulating a signal, one in each orthogonal polarization state. A Q bias signal is applied to the Q MZM to lock the Q MZM to the null position of its transfer curve as required for the modulation scheme. Likewise, an I bias signal is employed to lock the I MZM to the null position of its transfer curve as required for the modulation scheme. The DP-I/Q MZM also employs a Phase (P) MZM positioned as a parent MZM across the output of both the Q and I MZM. The P MZM also receives P bias signal to lock the P MZM to the quadrature position of its transfer curve as required for the modulation scheme. Each bias signal for I/Q/P MZMs are adjusted per error signal, which is generated as a product of dither signals applied on MZMs and the low frequency component of the detected optical signal at output of P MZM.

Using a traditional method, which will be described in further detail below, a DP-I/Q MZM cannot be locked to correct positions by using the traditional scheme under the following two scenarios. First, any initial starting value of I or Q MZM>90 degree away from their final locking values would result in MZM locking to a peak position instead of a null position. Second, a peak to peak driving voltage (Vpp) of the Radio Frequency (RF) transmission signal that approaches a half-wave voltage (Vπ) of the MZM transfer curve, results in a zero error signal used for locking. This is a generic issue of the traditional scheme, no matter for which type of DP-I/Q MZM (e.g., Lithium Niobate (LiNbO3), Indium Phosphide (InP), Silicon Photonics based (SiP), etc.).

Disclosed herein is a scheme for accurately biasing an DP-I/Q MZM in all scenarios including the scenarios discussed above. The scheme also functions accurately on any DP-I/Q MZM (e.g., LiNbO3, InP, and SiP). Specifically, the scheme generates a pair of orthogonal dither signals (d1 and d2). d1 and d2 are then applied to two of the six MZM inputs (XI, XQ, XP, YI, YQ, and YP) in a time-domain-multiplexing (TDM) fashion. A second ($2^{nd}$) order error signal is then generated based on the output of the MZM and d1 and d2. The error signal is then used to iteratively alter the bias signals and lock the corresponding MZM of the DP-I/Q MZM efficiently and accurately under all cases.

FIG. 1 is a schematic diagram of an embodiment of a DP-I/Q MZM based optical Tx 100. The Tx 100 modulates a light beam using an optical carrier's amplitude, phase, and/or polarization. The Tx 100 may comprise a continuous wave laser diode (CW-LD) 150 coupled to a a DP-I/Q MZM 105. The DP-I/Q MZM 105 may be composed of LiNbO3, InP, Si based materials, or combinations thereof. The DP-I/Q MZM 105 encodes a first polarization (X) and a second polarization (Y) of a carrier wave via an X assembly 120 and a Y assembly 130, respectively. The X assembly 120 comprises a XI MZM 121 and an XQ MZM 122 for encoding an I component and a Q component of the X polarization, respectively. Likewise, the Y assembly 130 comprises a YI MZM 131 and an YQ MZM 132 for encoding an I component and a Q component of the Y polarization, respectively. The X assembly 120 and the Y assembly 130 also comprise an XP MZM 123 and a YP MZM 133, respectively, for bias control. The DP-I/Q MZM 105 further comprises polarization splitter(s) and combiner(s) for combining the X portion and the Y portion. The DP-I/Q MZM 105 further comprises a Y photo detector (PDY) 161 and an X photodetector (PDX) 160 for detecting the output of the Y assembly 130 and the X assembly 120, respectively, for generating the error signal for bias locking.

The CW-LD 150 may be any tunable laser configured to transmit an optical carrier signal over an optical medium. The CW-LD 150 may be coupled to the DP-I/Q MZM 105 via an optical channel and may continuously transmit the optical carrier. Upon entering the DP-I/Q MZM 105, the optical carrier is split into an X carrier directed to the X assembly 120 and a Y carrier directed to the Y assembly 130, respectively, via an optical waveguide. For example the optical carrier may be split by a polarization beam splitter, which may be any optical device configured to split a light beam generated by a laser or other optical source, such as CW-LD 150, into two or more light beams and guide the light beams to associated modulator(s).

At the X assembly 120, the X carrier is further split into an XI carrier and an XQ carrier and forwarded to the XI MZM 121 and an XQ MZM 122, respectively, to receive an XI component and an XQ component, receptively, of an electrical signal, such as a radio frequency (RF) signal. The XI MZM 121 comprises a signal element for modulating a RF XI signal onto the X optical carrier and a bias element for applying an XI direct current (DC) bias signal to the XI MZM 121. As a non-limiting example, the signal elements and the bias element may selectively alter the refractive index of the waveguide in the XI MZM 121 to modulate the RF XI signal onto the X optical carrier. In an embodiment, the refractive index is altered by selectively applying heat to the waveguide via heating elements or by selectively altering the free electrons in the waveguide by employing capacitors and/or diodes, for example by employing electron depletion modulation. The RF XI signal may not modulate perfectly onto the optical carrier (e.g., due to phase drift inherent in the MZMs, etc.), so the XI bias signal is applied to correct errors and/or condition the XI optical signal during modulation. The XQ MZM 122 operates to modulate an RF XQ signal onto the optical carrier in substantially the same manner as the XI MZM 121. A XP MZM 123 spans the output of both the XI MZM 121 and the XQ MZM 122, and applies a XP DC bias signal to both the outputs. The XP MZM 123 modulates the signal in a manner similar to the signal and bias MZMs. The XP bias signal further conditions the combined X optical signal to ensure the combined X optical signal exits the X assembly 120 in the correct phase.

Figure 2:
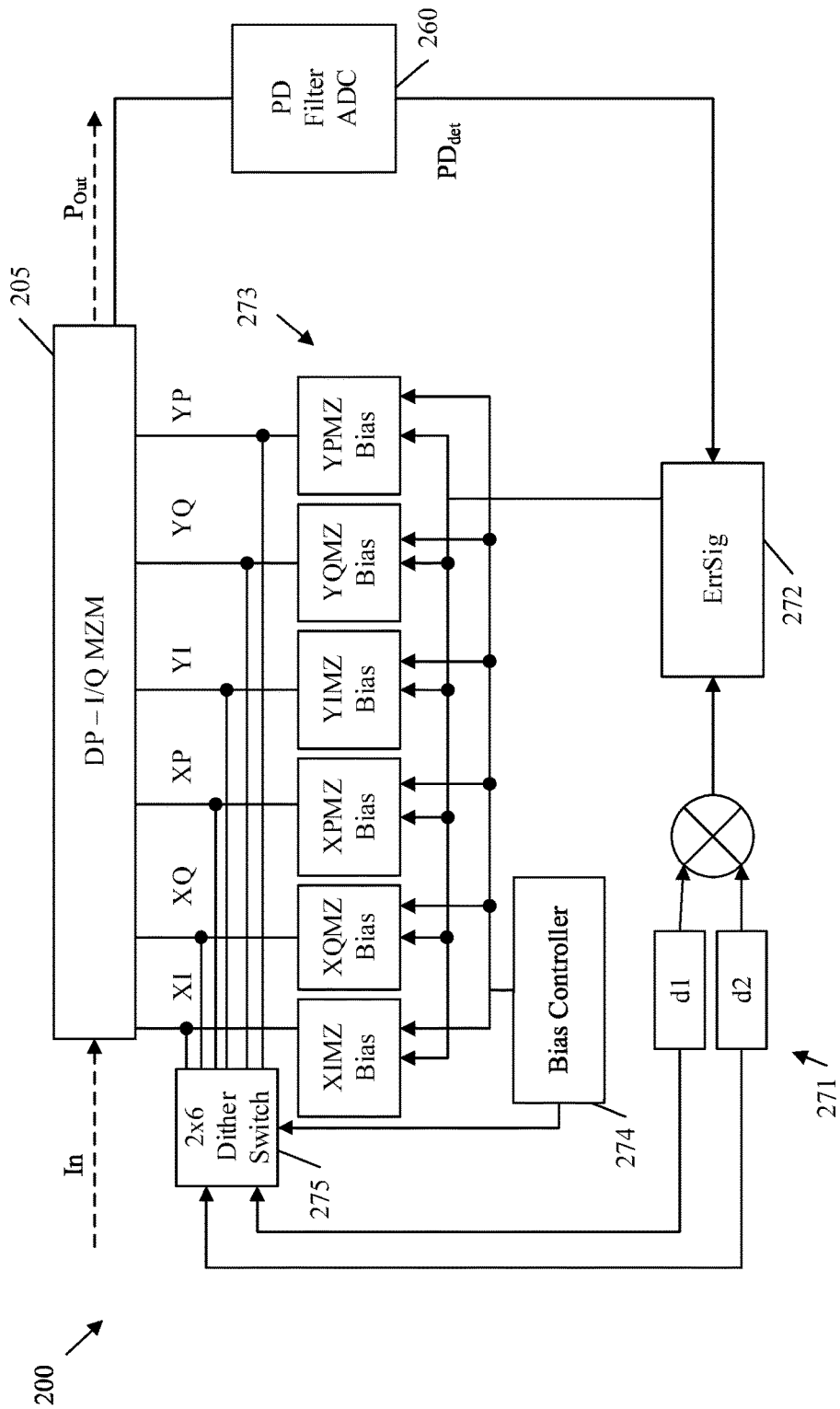
FIG. 2 is a schematic diagram of an embodiment of a DP-I/Q MZM bias controller network.

The PDX 160 may be configured to measure a portion of the combined output of the X assembly 120 (e.g., by converting the optical output into an electrical signal) and forward the measured portion of the signal to a bias controller, as shown in FIG. 2. The bias controller then calculates an error signal based on the results measured by PDX 160 and alters the XI, XQ, and XP bias signals to correct the detected error.

The Y assembly 130 employs a YI MZM 131, a YQ MZM 132, a YP MZM 133, and a PDY 161 which are substantially similar to the XI MZM 121, the XQ MZM 122, the XP MZM 123, and the PDX 160, respectively, and modulates an RF YI and YQ signal onto the Y optical carrier with corresponding bias signals. The Y optical signal is combined with the X optical signal to create a combined signal output ($P_{Out}$).

FIG. 2 is a schematic diagram of an embodiment of a DP-I/Q MZM bias controller network 200. Network 200 comprises a DP-I/Q MZM 205, which may be substantially similar to DP-I/Q MZM 105. DP-I/Q MZM 205 receives an optical carrier as an input (In) and modulates the signal as $P_{Out}$. Network 200 further comprises a photo detector (PD) 260. PD 260 comprises a PDY and a PDX, such as PDX 160 and PDY 161. PD 260 also comprises filter circuits for filtering sampled output from the PDX and PDY and/or an analog-to-digital (ADC) conversion circuit for converting the sampled and/or filtered output into a digital signal. PD 260 may be implemented as part of the DP-I/Q MZM 205, on a separate microcontroller, on a microcontroller that also comprises the rest of the network 200's components, or combinations thereof (e.g., PDs are implemented on the DP-I/Q MZM and filters/ADC implemented on a microcontroller, etc.).

Network 200 further comprises various components for controlling the various bias signals of the DP-I/Q MZM 205 according to the sampled outputs from the PD 260. The components of network 200, as described below, may be implemented as separate interconnected hardware components, implemented on a microcontroller in hardware, software, or firmware, or combinations thereof. Network 200 comprises a pair of orthogonal dither signal generators 271, which comprise any system configured to generate a first dither signal (d1) and a second dither signal (d2), which are orthogonal in phase. Signals are orthogonal when a dot product of vectors for each signal is always zero. For example, d1 and d2 are orthogonal when the signals are ninety degrees out of phase with one another. As such, signals d1 and d2, when combined, each apply an alternating current (AC) signal in a manner such that the d1 signal and the d2 signal do not interfere with each other. Dither signal generators 271 are coupled to a dither switch 275 and an error signal generator 272 (e.g., via a signal combiner). Accordingly, dither signal generators 271 provide the orthogonal dither signals d1 and d2 to the dither switch 275 and the error signal generator 272. The error signal generator 272 generates an error signal as a product of a detected signal and d1*d2 (also referred to as $D_{2nd}$), which is referred to herein as a second order dither signal.

Error signal generator 272 is coupled to the output of the PD 260 and the dither signal generators 271. An error signal generator 272 is any hardware/software module configured to iteratively generate an error signal (ErrSig) for each MZM component being locked, for example as described in method 400 below. In mathematical terms, the error signal generator 272 iteratively generates an error signal based on the second order dither signal ($D_{2nd}$) and the output of PD 260 ($PD_{det}$) by taking the integral of $D_{2nd}$ multiplied by PDdet, which may be represented as ErrSig=∫($D_{2nd}$*$PD_{det}$) dt. The error signal is transmitted to bias circuits 273 as shown in FIG. 2.

Bias circuits 273 are any hardware/software units configured to generate bias signals for the various bias inputs of the DP-I/Q MZM based on the error signal. Bias circuits 273 include an XI Mach-Zehnder (MZ) (XIMZ) bias circuit for generating an XI bias signal, an XQMZ bias circuit for generating an XQ bias signal, an XPMZ bias circuit for generating an XP bias signal, a YIMZ bias circuit for generating a YI bias signal, a XYQMZ bias circuit for generating a YQ bias signal, and a YPMZ bias circuit for generating a YP bias signal. The bias signals generated by the bias circuits are applied to the DP-I/Q MZM 205 in a manner substantially similar to the application of corresponding bias signals to DP-I/Q MZM 105. The bias circuits 273 generate their corresponding bias signals in order to reduce the error signal to zero, as shown in graphs 900-1100, by employing the iterative process of method 400.

Dither switch 275 is any switch configured to selectively switch the pair of orthogonal dither signals onto two of the six MZMs (e.g., XI, XQ, XP, YI, YQ, and/or YP) based on input from bias controller 274. Bias controller 274 is any hardware/software component configured to control the application of bias signals to the DP-I/Q MZM 205. The bias controller 274 is configured to control the bias circuits 273 and apply the pair of orthogonal dither signals onto the bias signals via the dither switch 275. Accordingly, the bias controller 274 is configured to select the DP-I/Q MZM 205 to lock at a specified time, apply the appropriate corresponding bias signals, and apply the orthogonal dither signals to the bias signals in TDM fashion, as discussed in method 400 below. The bias controller 274 can lock an X assembly element at substantially the same time as a Y assembly element or X and Y elements may be locked independently of one another. By employing methods 400-500 as discussed below, network 200 can lock in all I/Q/P MZMs to a null/null/quad from an arbitrary start location and in case Vpp=Vπ.

Using the traditional method briefly mentioned above, when only one dither signal is applied on XI or YI MZMs of a DP-I/Q MZM 205 to lock an XI or YI to a null position, the error signal used for bias locking can be described mathematically as:

$$\frac{\partial P_{out}}{\partial \alpha_{HI}} = -\frac{1}{8}\sin(\alpha_{HI})\cos(\beta) - \frac{1}{4}\cos\left(\frac{\alpha_{HQ}}{2}\right)\cos^2\left(\frac{\beta}{2}\right)\sin\left[\alpha_{HP} + \alpha_{HI} - \frac{\alpha_{HQ}}{2}\right],$$

Equation 1

-continued $$\text{Where } \beta = \frac{\pi}{2}\frac{V_{pp}}{V_\pi}$$

where $\partial P_{out}$ is the output power of the DP-I/Q MZM (β), $$\frac{\partial P_{out}}{\partial \alpha_{HI}}$$

is equivalent to the error signal induced by a phase shift caused by the I MZM, $\alpha_{HI}$ is the DC phase shift of the I MZM, $\alpha_{HQ}$ is the DC phase shift of the Q MZM, and $\alpha_{HP}$ is the phase shift of P MZM, and $$\frac{\pi}{2}\frac{V_{pp}}{V_\pi}$$

is the phase shift caused by modulator RF voltage peak to peak. The first term $$-\frac{1}{8}\sin(\alpha_{HI})\cos(\beta)$$

is the useful term for I MZM bias control, while second term $$-\frac{1}{4}\sin\left(\frac{\alpha_{HI}}{2}\right)\cos\left(\frac{\alpha_{HQ}}{2}\right)\cos^2\left(\frac{\beta}{2}\right)\cos(\alpha_{HP})$$

is a distortion term representing the crosstalk among I/Q/P MZMs. When Vpp/Vπ approaches 1, the first and useful term approaches zero, leaving only the distortion term. As such, when only a single dither is used, the corresponding I or Q MZM cannot be locked to null position. Further, this error signal cannot distinguish peak $\alpha_{HI}$=0 or null position $\alpha_{HI}$=π. As such, I or Q MZM may be incorrectly locked to peak position if initial start point is >90 degrees away from the null position. In this case, locking to null pre-calibration is needed to prevent locking to peak position.

In contrast to the traditional method, when two orthogonal dither signals are applied to a Q/P MZM of a DP-I/Q MZM 205 to lock an I MZM (e.g., a YI or a XI), the error signal from the DP-I/Q MZM 205 can be described mathematically as:

$$\frac{\partial^2 P_{out}}{\partial \alpha_{HQ}\partial \alpha_{HP}} = -\frac{1}{4}\cos\left(\frac{\alpha_{HI}}{2}\right)\cos^2\left(\frac{\beta}{2}\right)\cos\left[\alpha_{HP} + \frac{\alpha_{HI}}{2} - \alpha_{HQ}\right],$$

Equation 2 where all terms are the same as discussed with respect to equation 1. In this case, the error signal is non-zero when Vpp/Vπ approaches 1. Accordingly, network 200 can still determine $\alpha_{HI}$ and lock the I MZM even when Vpp/Vπ approaches 1. Besides, this error signal can distinguish peak $\alpha_{HI}$=0 or null $\alpha_{HI}$=π. As such, pre-calibration to avoid locking to the peak value is not needed for network 200. It should be noted that Equations 1-2 can be applied to a Q MZM as well when the I terms and the Q terms are interchanged.

As further proof, when two orthogonal dither signals are applied to I/Q MZMs of a DP-I/Q MZM 205 to lock a P MZM (e.g., a YP or a XP) the error signal from the DP-I/Q MZM 205 can be described mathematically as:

$$\frac{\partial^2 P_{out}}{\partial \alpha_{HI} \partial \alpha_{HQ}} = \frac{1}{8}\cos^2\left(\frac{\beta}{2}\right)\cos[\alpha_{HP} + \alpha_{HI} - \alpha_{HQ}],$$ Equation 3 where all terms are the same as discussed with respect to Equations 1-2. When locking the P MZM and Vpp/Vπ approaches 1, the error signal does not reduce to zero.

Figure 3:
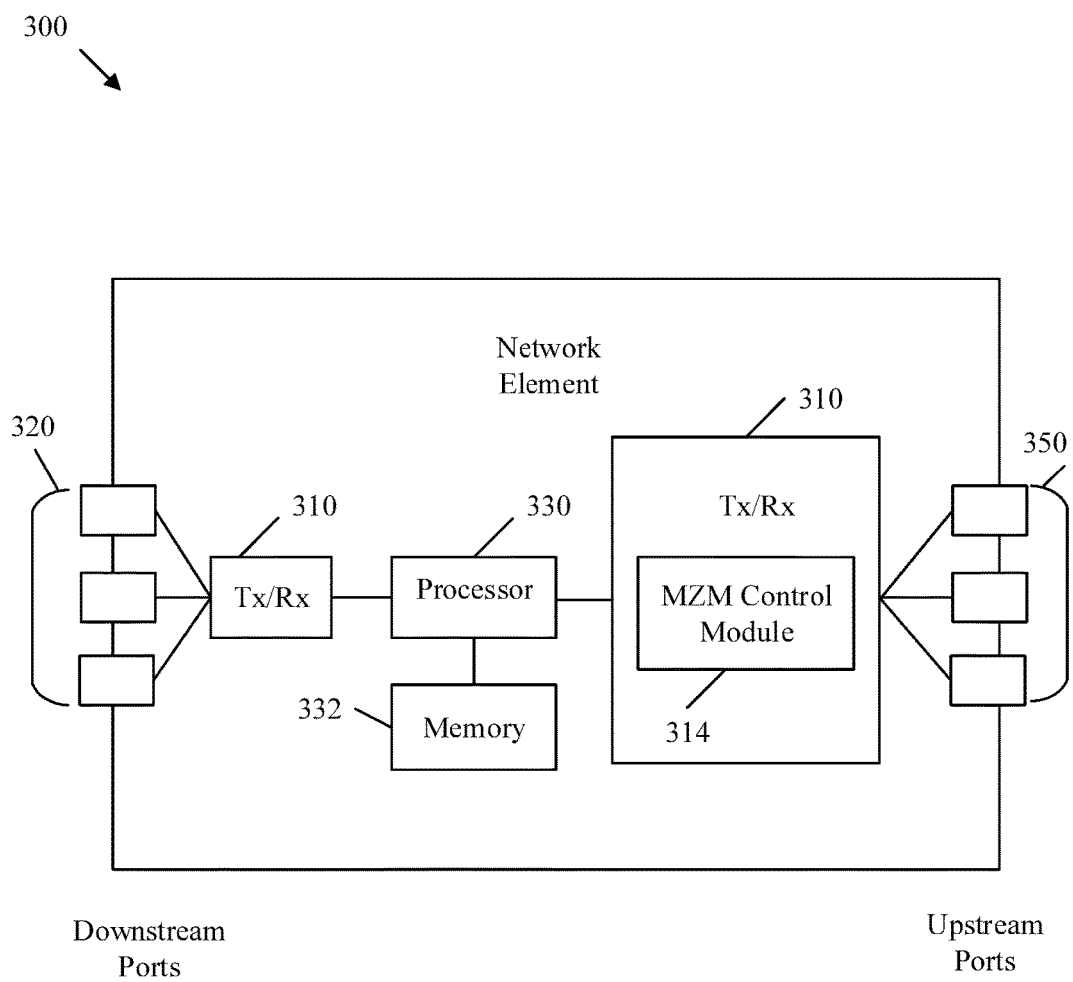
FIG. 3 is a schematic diagram of an embodiment of a transceiver unit.

FIG. 3 is a schematic diagram of an embodiment of a transceiver unit 300, which may be any device that transmits and/or receives optical signals with encoded data. For example, the transceiver unit 300 may be located in an optical transmission system, and may comprise a Tx such as Tx 100 that may comprise a bias controller network such as bias controller network 200. The transceiver unit 300 may be configured to implement or support any of the schemes described herein. In some embodiments transceiver unit 300 may also act as other node(s) in an optical transport network (OTN). One skilled in the art will recognize that the term transceiver unit encompasses a broad range of devices of which transceiver unit 300 is merely an example. Transceiver unit 300 is included for purposes of clarity of discussion, but is in no way meant to limit the application of the present disclosure to a particular transceiver unit embodiment or class of transceiver unit embodiments. At least some of the features/methods described in the disclosure may be implemented in a network apparatus or component such as a transceiver unit 300. For instance, the features/methods in the disclosure may be implemented using hardware, firmware, and/or software installed to run on hardware. The transceiver unit 300 may be any device that transports electrical and/or optical signals through a network, e.g., a switch, router, bridge, server, a client, etc. As shown in FIG. 3, the transceiver unit 300 may comprise transceivers (Tx/Rx) 310, which may be transmitters, receivers, or combinations thereof. A Tx/Rx 310 may be coupled to a plurality of downstream ports 320 (e.g., downstream interfaces) for transmitting and/or receiving frames from other nodes and a Tx/Rx 310 coupled to a plurality of upstream ports 350 (e.g., upstream interfaces) for transmitting and/or receiving frames from other nodes, respectively. A processor 330 may be coupled to the Tx/Rxs 310 to process the data signals and/or determine which nodes to send data signals to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). The transceiver unit 300 may comprise a MZM control module 314, which may be configured to monitor signals sent from modulators in one or more Txs (e.g., Tx/Rxs 310) positioned in transceiver unit 300 and bias such signals as discussed above in Tx 310 and/or bias controller network 200. The MZM control module 314 may be implemented as an ASIC, a DSP, a microcontroller, etc. In alternative embodiments, the MZM control module 314 may be implemented in processor 330, as instructions stored in memory 332, which may be executed by processor 330, and/or implemented in part in the processor 330 and in part in the memory 332. The downstream ports 320 and/or upstream ports 350 may contain electrical and/or optical transmitting and/or receiving components.

It is understood that by programming and/or loading executable instructions onto the transceiver unit 300, at least one of the processor 330, MZM control module 314, Tx/Rxs 310, memory 332, downstream ports 320, and/or upstream ports 350 are changed, transforming the transceiver unit 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
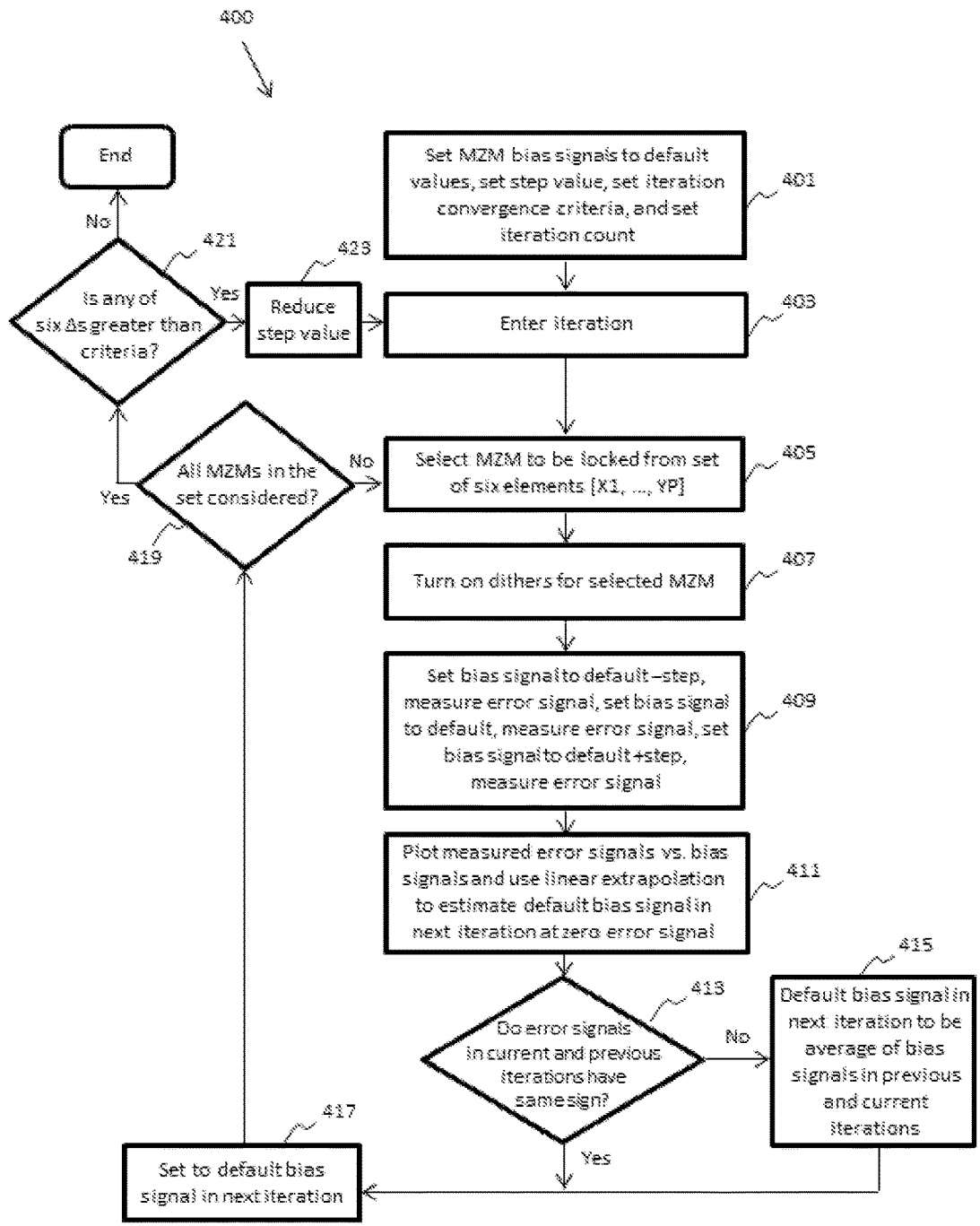
FIG. 4 is flowchart of an embodiment of a method of locking a I/Q/P MZMs of a DP-I/Q MZM to corresponding values of a null/null/quad position.

FIG. 4 is a flowchart of an embodiment of a method 400 of locking a I/Q/P MZMs of a DP-I/Q MZM to corresponding values of a null/null/quad position. Method 400 is initiated when a DP-I/Q MZM, such as bias controller network 200, determines to lock I/Q/P MZMs of a DP-I/Q MZM, such as DP-I/Q MZM 105 and/or 205, null/null/quad. At step 401, the bias signals for each of the MZMs (e.g., XI, XQ, XP, YI, YQ, and YP) are set to a predetermined default value and a step value is selected. An initial iterative count is also set. By way of example, the number of iterations could be set from 1 to 20 iterations. Step 403 enters iteration.

At step 405, one of the MZMs from the set of MZMs (e.g., XI, XQ, XP, YI, YQ, and YP) to be locked is selected. At step 407 a pair of orthogonal dithers are turned on for the corresponding pair of MZM for the MZM that was selected (e.g., XI/XP for XQ, YQ/YP for YI, etc.). At step 409, the bias signal is set to one of various steps and the error signal is measured for each step. In particular, the bias signal is set to a default − step and the error signal is measured, the bias signal is set to a default step and the error signal is measured, and the bias signal is set to a default + step and the error signal is measured. At step 411, the measured error signals vs bias signals are plotted and linear extrapolation is used to estimate the default bias signal in next iteration at zero error signal.

At step 413, the sign of the error signal in current iteration is compared to the sign of error signal in previous iteration. If the error signals in current and previous iterations have different signs (e.g., one negative, one positive), the default bias signal in next iteration is the average of the default bias signal in current and previous iterations at step 415 and the process proceeds to step 417. If, on the other hand, the error signals in current and previous iteration both have the same sign (e.g., both negative or both positive), the process proceeds to step 417. In setting the bias signal for the next iteration at step 417, the bias signal may be either the bias signal that was calculated by averaging at step 415 or the bias signal that was determined through extrapolation at step 411.

At step 419, a determination of whether all the MZMs from the set have been considered. If not, another one of the MZMs from the set of six available MZMs is selected at step 405 and the loop is repeated as shown by the flowchart. If yes, the process proceeds to step 421. At step 421, the current six bias signals (e.g., for the set of six MZMs-XI, XQ, XP, YI, YQ, and YP) are compared to the previous six bias signals to obtain six absolute delta (Δ) values to be compared to a predetermined criteria. If any of the six absolute delta values is greater than the predetermined criteria, the process proceeds to step 423 where the step value is reduced and the process continues and the iteration is repeated as shown by the flowchart. If, on the other hand, all of the six delta values is less than or equal to the predetermined criteria, the process ends.

In an embodiment, the method of FIG. 4 is implemented in a TDM fashion. For example, a DP-I/Q MZM such as DP-I/Q MZM 105 via DP-I/Q MZM bias controller network 200 may be biased using TDM principles. Where TDM is utilized, the inner loop iteration (e.g., steps 405, 407, 409, 411, 413, perhaps 415, 417, and 419 of FIG. 4) and the outer loop iteration (e.g., steps 403, 417, 419, 421, 423 of FIG. 4) are performed as described above. However, the orthogonal dither pair (d1, d2) is only applied on two of the three modulators (e.g., on Q/PMZ for IMZ locking, on I/PMZ for QMZ locking, and on I/QMZ for PMZ locking).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a Dual Polarization (DP)-Inphase/Quadrature (I/Q) Mach-Zehnder Modulator (MZM) bias controller, the method comprising:
   generating a pair of orthogonal dither signals;
   multiplying the pair of orthogonal dither signals to create a second order dither signal; and
   locking an Inphase (I) MZM of a DP-I/Q MZM to a value of a corresponding I component of a transmission signal by:
   applying the pair of orthogonal dither signals to a Quadrature (Q) MZM and a Phase (P) MZM of the DP-I/Q MZM;
   applying an I bias signal to the I MZM of the DP-I/Q MZM;
   detecting an output of the DP-I/Q MZM; and
   determining an I error signal in an output of the I MZM of the DP-I/Q MZM using a product of the second order dither signal received at a first input of an error signal generator and the output of the DP-I/Q MZM received at a second input of the error signal generator.

2. The method of claim 1, further comprising:
   locking the Q MZM of the DP-I/Q MZM to a value of a corresponding Q component of the transmission signal by:
   applying the pair of orthogonal dither signals to the I MZM and the P MZM of the DP-I/Q MZM;
   applying a Q bias signal to the Q MZM of the DP-I/Q MZM;
   detecting an output of the DP-I/Q MZM; and
   determining a Q error signal in an output of the Q MZM of the DP-I/Q MZM based on the product of the second order dither signal and the output of the DP-I/Q MZM.

3. The method of claim 2, further comprising:
   locking a phase of the DP-I/Q MZM to a value of a corresponding combined I/Q value of the transmission signal by:
   applying the pair of orthogonal dither signals to the Q MZM and the I MZM of the DP-I/Q MZM;
   applying a P bias signal to the P MZM of the DP-I/Q MZM;
   detecting an output of the DP-I/Q MZM; and
   determining a P error signal in the output of the DP-I/Q MZM based on the product of the second order dither signal and the output of the DP-I/Q MZM.

4. The method of claim 3, further comprising:
   iteratively adjusting the I bias signal based on the I error signal to support locking the I MZM to the I component of the transmission signal;
   iteratively adjusting the Q bias signal based on the Q error signal to support locking the Q MZM to the Q component of the transmission signal; and
   iteratively adjusting the P bias signal based on the P error signal to support locking the P MZM to the combined I/Q value of the transmission signal.

5. The method of claim 4, wherein the I MZM, the Q MZM, and the P MZM are locked starting from arbitrary values and without pre-calibrating the DP-I/Q MZM.

6. The method of claim 4, wherein the I MZM, the Q MZM, and the P MZM are locked when peak to peak driving voltage of transmission data (Vpp) is equal to a half-wave voltage (Vπ) of the DP-I/Q MZM.

7. The method of claim 3, wherein the pair of orthogonal dither signals is applied to the I MZM and the Q MZM but not the P MZM when locking the P MZM.

8. The method of claim 3, wherein the pair of orthogonal dither signals is applied to the I MZM and the P MZM but not the Q MZM when locking the Q MZM.

9. The method of claim 3, wherein the pair of orthogonal dither signals is applied to the Q MZM and the P MZM but not the I MZM when locking the I MZM.

10. A Dual Polarization (DP) - Inphase/Quadrature (I/Q) Mach-Zehnder Modulator (MZM) bias controller comprising:

a Quadrature (Q) bias circuit configured to generate a Q bias signal for application to a Q MZM of a DP-I/Q MZM to lock the Q MZM to a value of a corresponding Q component of a transmission signal;

a dither signal generator configured to generate a pair of orthogonal dither signals;

a dither switch coupled to the Q bias circuit and the dither signal generator, the dither switch configured to combine the pair of orthogonal dither signals with an Inphase (I) bias signal and a Phase (P) bias signal; and an error signal generator coupled to the Q bias circuit and the dither signal generator, the error signal generator configured to:
- receive a second order orthogonal dither signal, the second order orthogonal dither signal a product of the pair of orthogonal dither signals;
- receive an output of the DP-I/Q MZM; and
- determine a Q error signal as the product of the output of the Q MZM of the DP-I/Q MZM and the second order dither signal.

11. The DP-I/Q MZM bias controller of claim 10, further comprising a bias controller configured to cause the dither switch to combine the pair of orthogonal dither signals with the Q bias signal and the I bias signal but not the P bias signal when locking a P MZM of the DP-I/Q MZM to a combined I/Q value of the transmission signal.

12. The DP-I/Q MZM bias controller of claim 11, wherein the bias controller is further configured to cause the dither switch to combine the pair of orthogonal dither signals with the Q bias signal and the P bias signal but not the I bias signal when locking an I MZM of the DP-I/Q MZM to an I value of the transmission signal.

13. The DP-I/Q MZM bias controller of claim 12, wherein the bias controller is further configured to cause the dither switch to combine the pair of orthogonal dither signals with the I bias signal and the P bias signal but not the Q bias signal when locking the Q MZM of the DP-I/Q MZM to a Q value of the transmission signal.

14. The DP-I/Q MZM bias controller of claim 13, wherein the bias controller is further configured to lock the I MZM, the Q MZM, and the P MZM starting from arbitrary values and without pre-calibrating the DP-I/Q MZM.

15. The DP-I/Q MZM bias controller of claim 13, wherein the bias controller is further configured to lock the I MZM, the Q MZM, and the P MZM when a peak to peak driving voltage of transmission data (Vpp) is equal to a half-wave voltage (Vπ) of the DP-I/Q MZM.

16. The DP-I/Q MZM bias controller of claim 10, further comprising an Inphase (I) bias circuit coupled to the dither switch, the I bias circuit configured to generate the I bias signal for application to an I MZM of the DP-I/Q MZM to lock the I MZM to a value of a corresponding I component of a transmission signal, wherein the dither switch is further configured to combine the pair of orthogonal dither signals with the Q bias signal, and wherein the error signal generator is further configured to determine an I error signal in the output of the I MZM of the DP-I/Q MZM based on the product of the second order dither signal and the output of the DP-I/Q MZM.

17. A method implemented in a Dual Polarization (DP) - Inphase/Quadrature (I/Q) Mach-Zehnder Modulator (MZM) bias controller, the method comprising:
- generating a pair of orthogonal dither signals;
- multiplying the pair of orthogonal dither signals to create a second order dither signal;
- applying an Inphase (I) bias signal to an I MZM of a DP-I/Q MZM to lock the I MZM to a value of a corresponding I component of a transmission signal;
- combining the pair of orthogonal dither signals with a Quadrature (Q) bias signal and a Phase (P) bias signal;
- detecting an output of the DP-I/Q MZM; and
- determining an I error signal in an output of the I MZM of the DP-I/Q MZM using a product of the second order dither signal received at a first input of an error signal generator and the output of the DP-I/Q MZM received at a second input of the error signal generator.

18. The method of claim 17, further comprising:
- applying a Q bias signal to a Q MZM of the DP-I/Q MZM to lock the Q MZM to a value of a corresponding Q component of the transmission signal;
- combining the pair of orthogonal dither signals with the I bias signal and the P bias signal; and
- determining a Q error signal in an output of the Q MZM of the DP-I/Q MZM based on the product of the second order dither signal and the output of the DP-I/Q MZM.

19. The method of claim 18, further comprising:
- applying the P bias signal to lock a P MZM of the DP-I/Q MZM to a combined I/Q value of the transmission signal; and
- determining a P error signal in the output of the DP-I/Q MZM based on the product of the second order dither signal and the output of the DP-I/Q MZM.

20. The method of claim 19, further comprising employing a time division multiplexing (TDM) scheme to apply the second order dither signal to the P bias signal, the I bias signal, and the Q bias signal such that the second order dither signal is:
- applied to the I bias signal and the Q bias signal when the P MZM is being locked;
- applied to the I bias signal and the P bias signal when the Q MZM is being locked; and
- applied to the P bias signal and the Q bias signal when the I MZM is being locked.

* * * * *

UNITED STATES PATENT AND TRADEMARK OFFICE
CERTIFICATE OF CORRECTION

PATENT NO. : 10,042,190 B2
APPLICATION NO. : 15/179704
DATED : August 7, 2018
INVENTOR(S) : Tiangong Liu et al.

It is certified that error appears in the above-identified patent and that said Letters Patent is hereby corrected as shown below:

On the Title Page

(72) Inventors should read:
Tiangong Liu, San Jose, CA (US); Hongbing Lei, San Jose, CA (US); Xiao Shen, San Bruno, CA (US)

Signed and Sealed this
Eighteenth Day of September, 2018

Andrei Iancu
*Director of the United States Patent and Trademark Office*